(12) United States Patent
Okabe

(10) Patent No.: US 8,643,877 B2
(45) Date of Patent: Feb. 4, 2014

(54) IMAGE FORMING APPARATUS AND CONTROL METHOD THEREFOR AND STORAGE MEDIUM

(75) Inventor: Kouya Okabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 12/856,914

(22) Filed: Aug. 16, 2010

(65) Prior Publication Data

US 2011/0051193 A1   Mar. 3, 2011

(30) Foreign Application Priority Data

Aug. 25, 2009   (JP) ................................. 2009-194038

(51) Int. Cl.
*G06F 3/12*   (2006.01)

(52) U.S. Cl.
USPC ......................................... 358/1.15; 358/1.16

(58) Field of Classification Search
USPC ........................................................ 358/1.15
See application file for complete search history.

(56) References Cited

U.S. PATENT DOCUMENTS

| | | | |
|---|---|---|---|
| 5,854,693 A * | 12/1998 | Yoshiura et al. .............. | 358/468 |
| 6,509,900 B1 * | 1/2003 | Ohsawa et al. ............... | 345/543 |
| 6,816,498 B1 * | 11/2004 | Viswanath ..................... | 370/412 |
| 2003/0020960 A1 * | 1/2003 | Tanimoto ...................... | 358/402 |
| 2007/0204045 A1 * | 8/2007 | Shima ........................... | 709/226 |
| 2008/0071748 A1 * | 3/2008 | Wroblewski et al. ............. | 707/3 |
| 2009/0161155 A1 * | 6/2009 | Baba et al. ................... | 358/1.15 |
| 2010/0079781 A1 * | 4/2010 | Yamamoto ................... | 358/1.13 |
| 2012/0117304 A1 * | 5/2012 | Worthington et al. ........ | 711/103 |

FOREIGN PATENT DOCUMENTS

JP   2004-186823 A   7/2004

* cited by examiner

*Primary Examiner* — Marivelisse Santiago Cordero
*Assistant Examiner* — Daryl Jackson
(74) *Attorney, Agent, or Firm* — Carter, DeLuca, Farrell & Schmidt LLP

(57) ABSTRACT

An image forming apparatus includes a sever access unit configured to acquire information representing an amount of use of a storage area from a document management server, and a determination unit configured to determine whether the amount of use exceeds a threshold when data is stored in the storage area by checking the size of the data. A document storage unit stores the data in a storage unit in the image forming apparatus when the amount of use exceeds the threshold, and stores management information relating to a storage location of the data in the storage unit in the document management server. The document storage unit stores the data in the storage area when the amount of use is the threshold or less.

13 Claims, 11 Drawing Sheets

FIG. 4

| DOCUMENT ID | IMAGE FORMING APPARATUS ID | SCAN DATE | SIZE | USER ID | STORAGE LOCATION |
|---|---|---|---|---|---|
| 2318 | 372-011 | 2009/06/22 | 560KB | 38272 | xxxxxxx |
| 2319 | 372-011 | 2009/06/22 | 40KB | 25681 | xxxxxxx |
| 2320 | 372-005 | 2009/06/22 | 430KB | 20393 | xxxxxxx |
| 2321 | 372-007 | 2009/06/22 | 350KB | 35238 | xxxxxxx |

FIG. 7

| DOCUMENT ID | ACCESS FREQUENCY | PRINT FREQUENCY |
|---|---|---|
| 2318 | 4 | 1 |
| 2319 | 1 | 0 |
| 2320 | 25 | 8 |
| 2321 | 5 | 0 |

FIG. 10

| DOCUMENT ID | ACCESS USER | ACCESS DATE |
|---|---|---|
| 1756 | 49283 | 2009/06/18 |
| 2310 | 28271 | 2009/06/22 |
| 2045 | 19928 | 2009/06/24 |

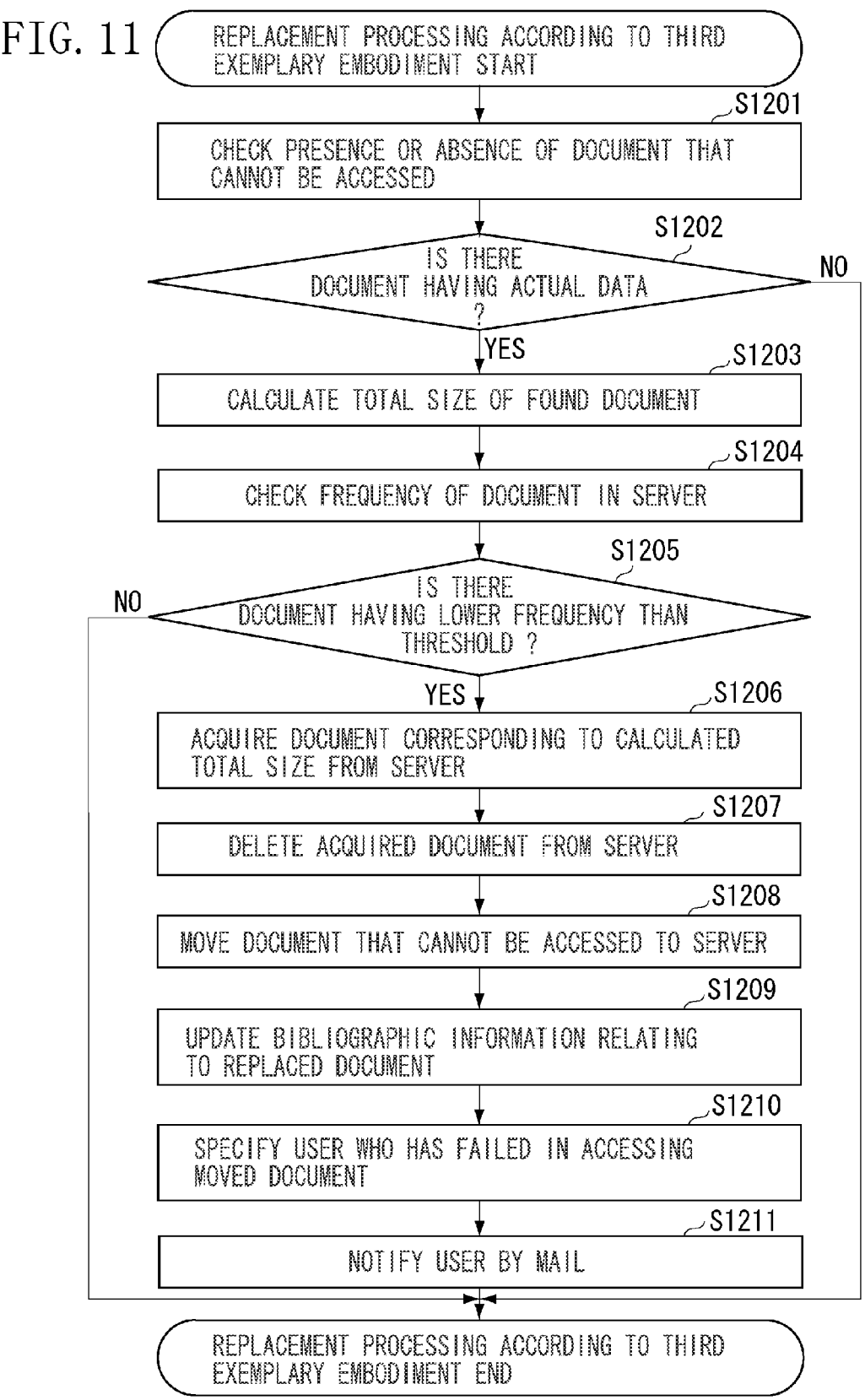

IMAGE FORMING APPARATUS AND CONTROL METHOD THEREFOR AND STORAGE MEDIUM

BACKGROUND OF THE INVENTION

1. Field of the Invention

The present invention relates to an image forming apparatus and a control method therefor, and a program, and more particularly, to processing for switching a storage destination of data acquired by reading an image.

2. Description of the Related Art

From the needs of high efficiency and low cost of a method for managing a large number of paper documents, momentum toward computerizing paper documents in an office have rapidly been increased. A document management system storing scanned documents from an image forming apparatus such as a scanner or a digital multifunction peripheral to a document management server has been spread widely.

On the other hand, a service that has been so far provided in a corporate intranet can be transferred onto the Internet, and a client can use the service, as needed, and pay a fee for the used service.

In the document management server, there is a method for charging a fee for an amount of use of a storage area in the server, for example. More specifically, a fee to be charged a client increases as the amount of use increases, unlike a document management system that has been so far used in an intranet. In the above-mentioned system, when the amount of use is expected to exceed a threshold, charging of an additional fee can be avoided by suppressing storage of a scanned document in the document management server or storing the scanned document in another designated storage location.

As a conventional technique, a method for changing a storage destination of a scanned document according to its capacity has been known (Japanese Patent Application Laid-Open No. 2004-186823). In this technology, an image forming apparatus that has made a scan basically stores document data in its own built-in storage device. When it is determined that anymore document data cannot be stored in the built-in storage device, the document data is stored in a computer on a network.

In a conventional technique, a data storage destination is not managed in consideration of realization of a system in which a fee is charged for an amount of use of a storage area in a document management server. In Japanese Patent Laid-Open No. 2004-186823, for example, the scanned document is only temporarily retracted due to exhaustion of the capacity. A situation where a fee is charged for an amount of use of the storage area in the document management server is not assumed, and later use of the scanned document is not considered. More specifically, work for manually collecting scanned documents that have been temporarily stored in a distributed manner is required.

SUMMARY OF THE INVENTION

According to an aspect of the present invention, an image forming apparatus includes a first acquisition unit configured to acquire information representing an amount of use of the storage area of the document management apparatus, a determination unit configured to determine whether the amount of use exceeds a threshold when the data stored in the storage area, and a document storage unit configured to store the data in a storage unit in the image forming apparatus when the amount of use exceeds the threshold, and store the data in the storage area when the amount of use is less than or equal to the threshold.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a table illustrating bibliographic information relating to a scanned document according to the first exemplary embodiment of the present invention.

FIG. 7 illustrates frequency information according to the second exemplary embodiment of the present invention.

FIG. 10 is a table illustrating inaccessible information according to the third exemplary embodiment of the present invention.

FIG. 11 is a flowchart illustrating an example of scanned document replacement processing according to the third exemplary embodiment of the present invention.

DESCRIPTION OF THE EMBODIMENTS

Various exemplary embodiments, features, and aspects of the invention will be described in detail below with reference to the drawings.

Figure 1:
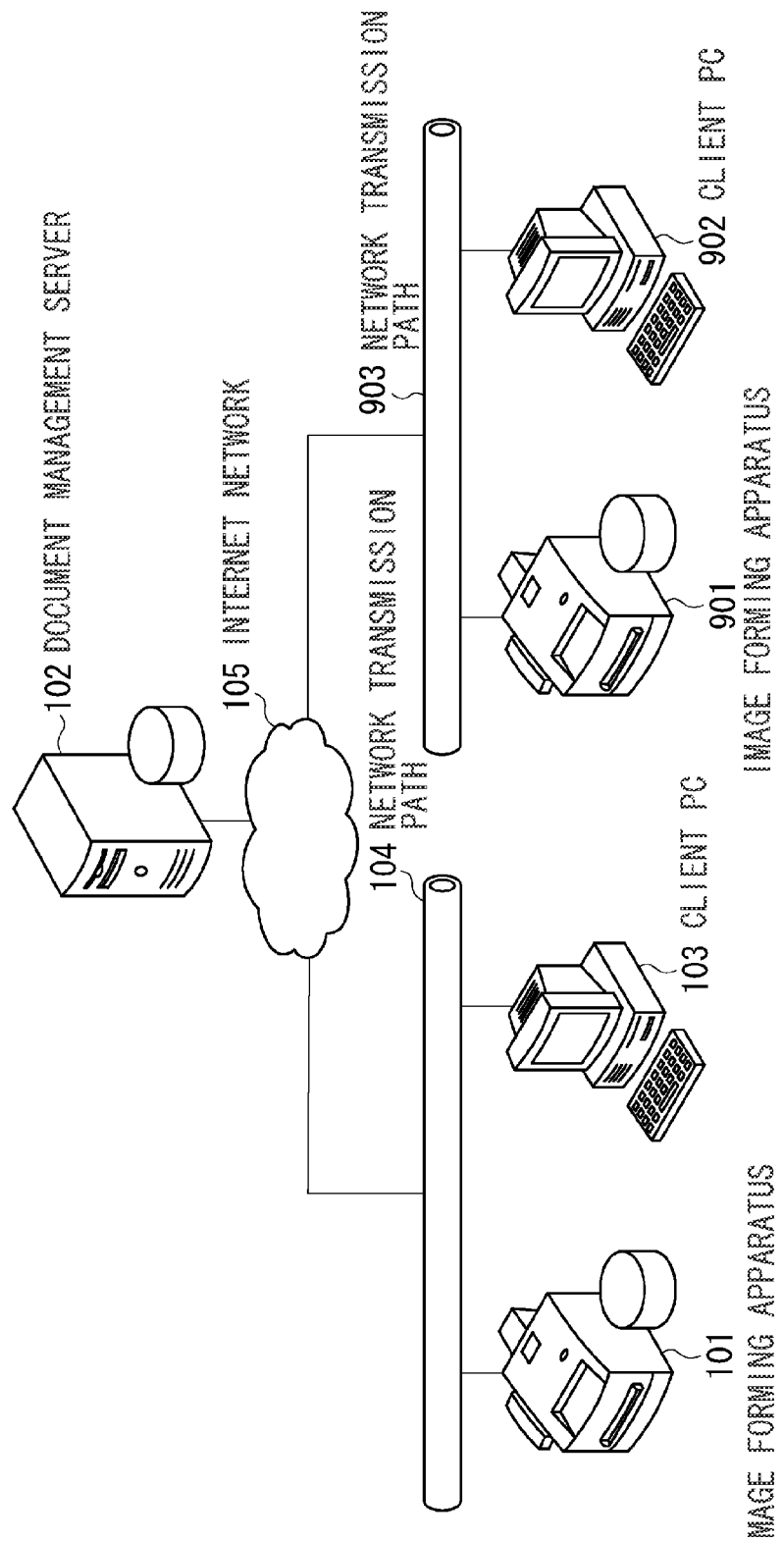
FIG. 1 illustrates a system configuration according to an exemplary embodiment of the present invention.

A first exemplary embodiment of the present invention will be described with reference to FIGS. 1 to 5. FIG. 1 illustrates an example of a configuration of a system including an image forming apparatus to which the present invention can be applied, a server serving as a document management apparatus, and a client machine (hereinafter referred to as a client personal computer (PC)).

The system according to the present exemplary embodiment includes at least an image forming apparatus 101, a document management server 102, and a client PC 103. The image forming apparatus 101 and the client PC 103 are connected to each other via a wired or wireless network transmission path 104 such as Ethernet (trade mark). The document management server 102 is connected to the network transmission path 104 via an Internet network 105. An image forming apparatus 901, a client PC 902, and a network transmission path 903, illustrated in FIG. 1, will be described in a third exemplary embodiment, described below.

The image forming apparatus 101 receives a scan instruction issued by a user operation, reads an image on a paper document to generate electronic document data, and stores the data in the document management server 102. The document management server 102 stores the electronic document data, and provides a service according to a request for browsing or searching from the client PC 103.

The document management server 102 charges the client PC 103 a fee for an amount of use of a storage area of the electronic document data. In the client PC 103, a browser and a dedicated application are operated, and are used to access the document management server 102.

A system configuration illustrated in FIG. 1 is illustrative only. The present invention can be applied to any system whether the system includes a single apparatus or a plurality of apparatuses, as long as the function of the present invention is implemented. The system includes a system in which a database server connected to the document management server 102 exists and a system in which a plurality of client PCs 103 exists.

Figure 2:
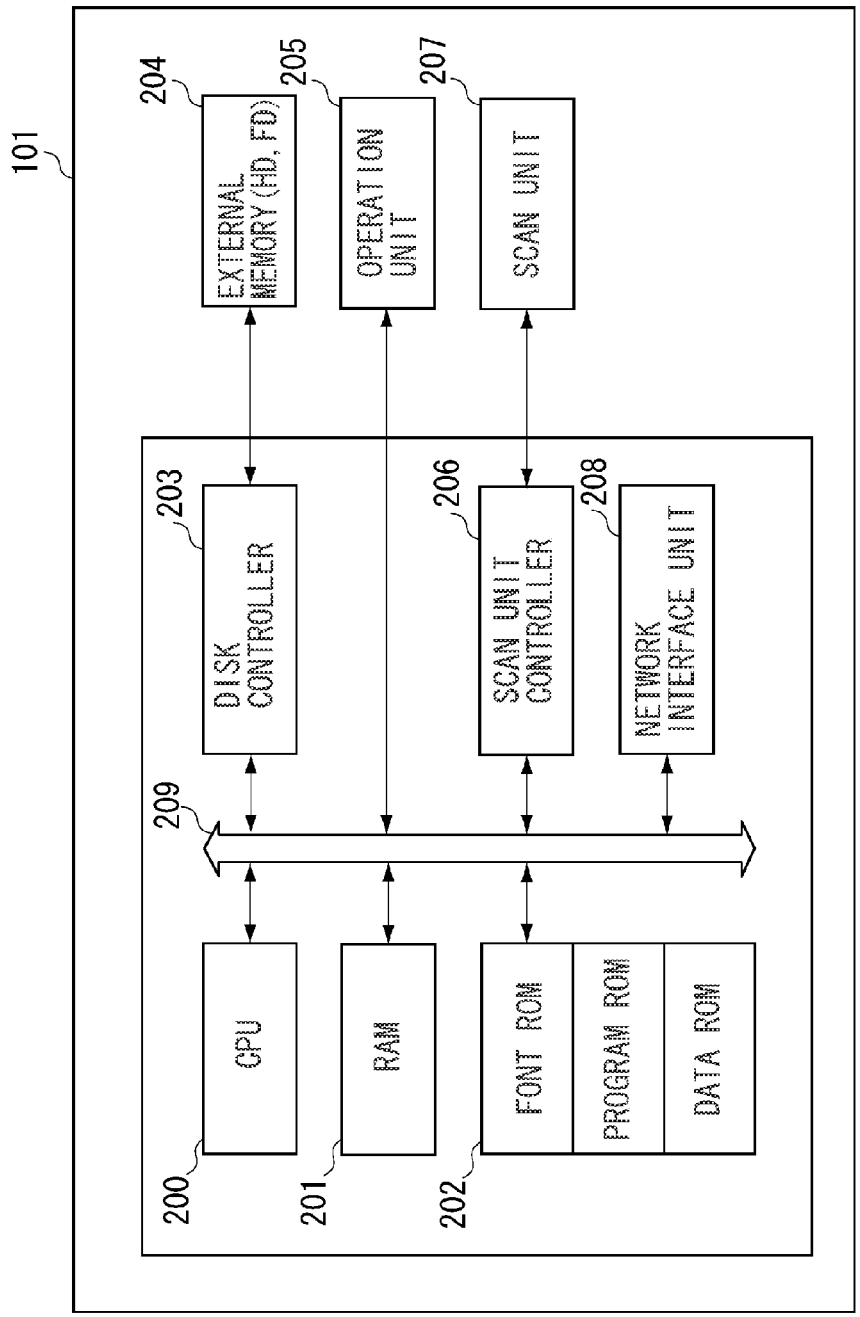
FIG. 2 is a block diagram illustrating an example of a hardware configuration of an image forming apparatus.

FIG. 2 illustrates an example of a hardware configuration of the image forming apparatus 101 to which the present invention can be applied. A central processing unit (CPU) 200 reads out programs stored in a read-only memory (ROM) 202 or an external memory 204 using a recording medium such as a hard disk (HD) or a flexible disk (FD), and executes the read programs.

The programs include an operating system (OS) and an application that are stored in a program ROM area in the ROM 202 or are loaded into a random access memory (RAM) 201 from the external memory 204. The CPU 200 interprets and executes the programs, to implement processes in each flowchart, described below. The RAM 201 functions as a main memory or a work area in the CPU 200.

A disk controller 203 controls data access to the external memory 204 serving as a storage unit of various types of data. An operation unit 205 has an operation switch, a light emitting diode (LED) display, and so on arranged thereon, and receives instructions such as a scan instruction by a user operation. Various types of data and messages are displayed in a display area of the operation unit 205.

A scan unit controller 206 controls a scan unit 207. The scan unit 207 optically reads a document image and converts the document image into digital image information, and outputs the digital image information to the scan unit controller 206 and generates image data.

A network interface unit 208 performs control to send and receive data to and from another communication terminal device via a communication line. The units excluding the external memory 204 and the scan unit 207 are connected to a system bus 209, and are controlled by the CPU 200. While components for printing and facsimile communication, for example, may be provided, as needed, in addition to the above-mentioned components, they are not directly related to the present invention and hence, the illustration thereof is omitted.

The document management server 102 also includes components of a computer, as described above. Information representing an amount of use of a storage area of data for which a fee is to be charged is provided via a network in response to a request from the image forming apparatus 101.

Figure 3:
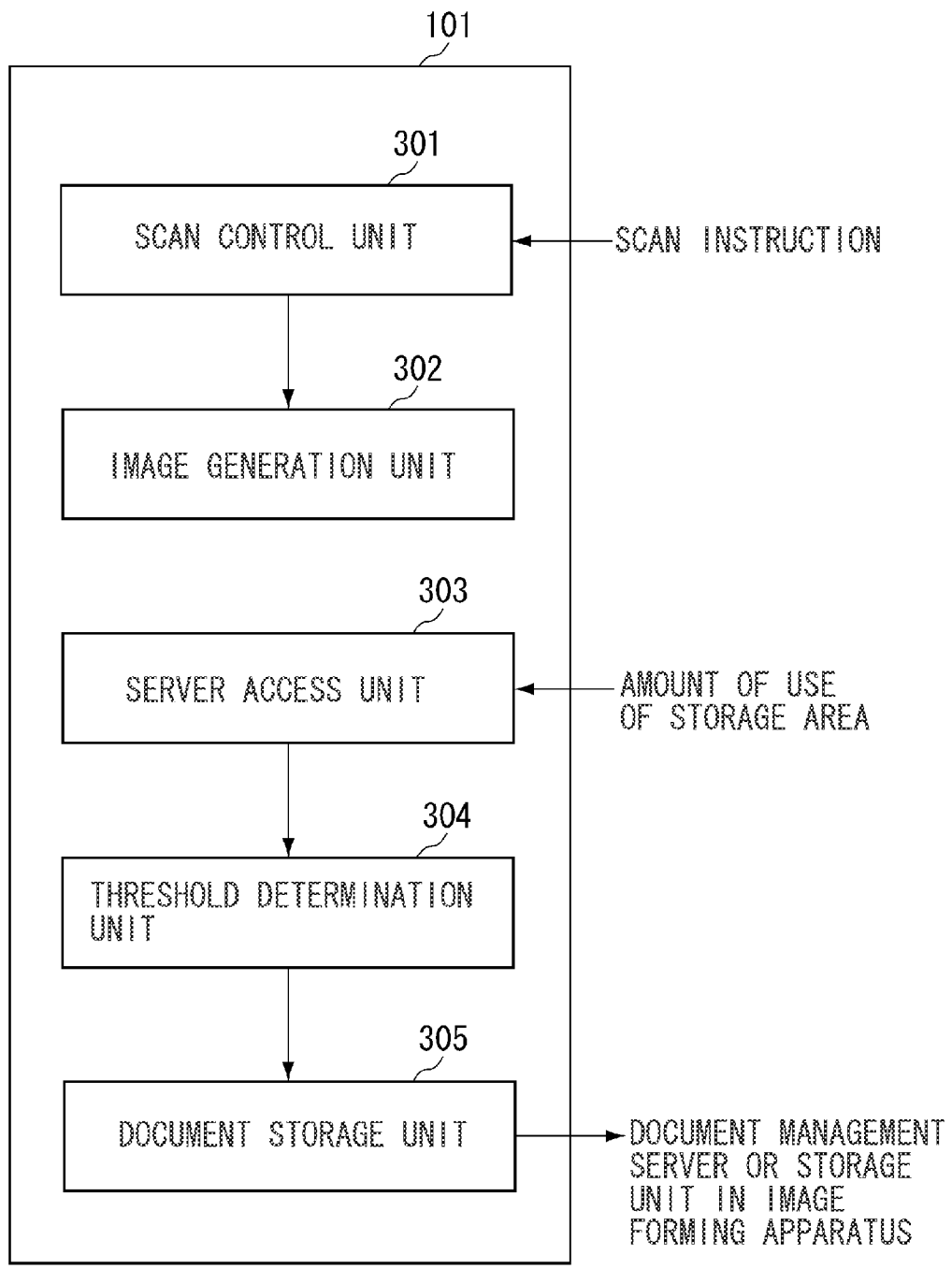
FIG. 3 is a functional block diagram illustrating an example of a configuration for software processing according to a first exemplary embodiment of the present invention.

FIG. 3 illustrates an example in which a configuration is visualized for software processing in the image forming apparatus 101. The image forming apparatus 101 illustrated in this example includes a scan control unit 301, an image generation unit 302, a server access unit 303, a threshold determination unit 304, and a document storage unit 305.

The scan control unit 301 optically reads, when it receives a scan instruction issued by a user operation, a paper document according to the instruction, and delivers digital image information to the image generation unit 302. The image generation unit 302 generates image data from the received digital image information. The generated image data is referred to as a scanned document or merely referred to as a document. The image generation unit 302 checks the size of the generated scanned document.

The server access unit 303 accesses the document management server 102, checks an amount of use of a storage area in the document management server 102, and acquires its result. If another image forming apparatus connected to the document management server 102 exists at this time, its amount of use is also added thereto. The server access unit 303 not merely obtains the amount of use but also acquires information indicating "how much capacity remains up to a charging threshold".

The threshold determination unit 304 determines a charging threshold by calculating a remaining capacity up to a threshold (determination reference value) based on a capacity checked by the server access unit 303. The charging threshold means a boundary value at which a fee to be charged increases when exceeded. The threshold may be obtained from the document management server 102 by the server access unit 303, or may be obtained from the external memory 204 in the image forming apparatus 101. Alternatively, the threshold may be a value that has already been registered in advance as a system, or may be a value set by a system administrator.

The threshold determination unit 304 determines, when the scanned document generated by the image generation unit 302 is stored in the storage area in the document management server 102, whether an amount of data that has already been stored exceeds a storage capacity threshold.

The threshold determination unit 304 stores in a memory a determination result in previous scan processing, i.e., information indicating whether the remaining capacity is small and the amount of data exceeds the threshold. The threshold determination unit 304 determines at which time point the scanned document stored in the external memory 204 is to be stored in the storage area in the document management server 102 based on the information.

The document storage unit 305 stores the scanned document in the storage area in the document management server 102 or a storage unit (the external memory 204 in this example) in the image forming apparatus 101 in relation to management information (hereinafter referred to as bibliographic information) at its storage destination. The storage destination of the scanned document is determined according to the determination result by the threshold determination unit 304. The document storage unit 305 can also store the scanned document in the external memory 204 and store only the bibliographic information in the document management server 102.

FIG. 4 illustrates an example of bibliographic information 401 in a table format. The bibliographic information 401 exists in the document management server 102, and is rewritten in a write-once manner by the document storage unit 305. The bibliographic information 401 is referred to, to find which image forming apparatus stores a corresponding scanned document.

The bibliographic information 401 includes identification information for specifying a scanned document, an image forming apparatus, and a user, information representing a scan date and a size, and information representing a storage location. In this example, document identification (ID) information 402 and image forming apparatus ID information 403 are represented by numbers. Scan date information 404 relating to a date on which a scan has been made is represented in a "year/month/day" format, and size information 405 relating to the size of a scanned document is represented in units of kilobytes (KB). User ID information 406 relating to a user who has made a scan is specified by numbers.

As to information 407 for specifying a storage location of a scanned document, when the scanned document is stored in the document management server 102, UniformResource Locator (URI) information, for example, is set. When the scanned document is stored in the image forming apparatus 101, image forming apparatus ID information, which is similar to the ID information 403, for example, is set. Items illustrated in FIG. 4 are illustrative only and not a limitation.

Figure 5:
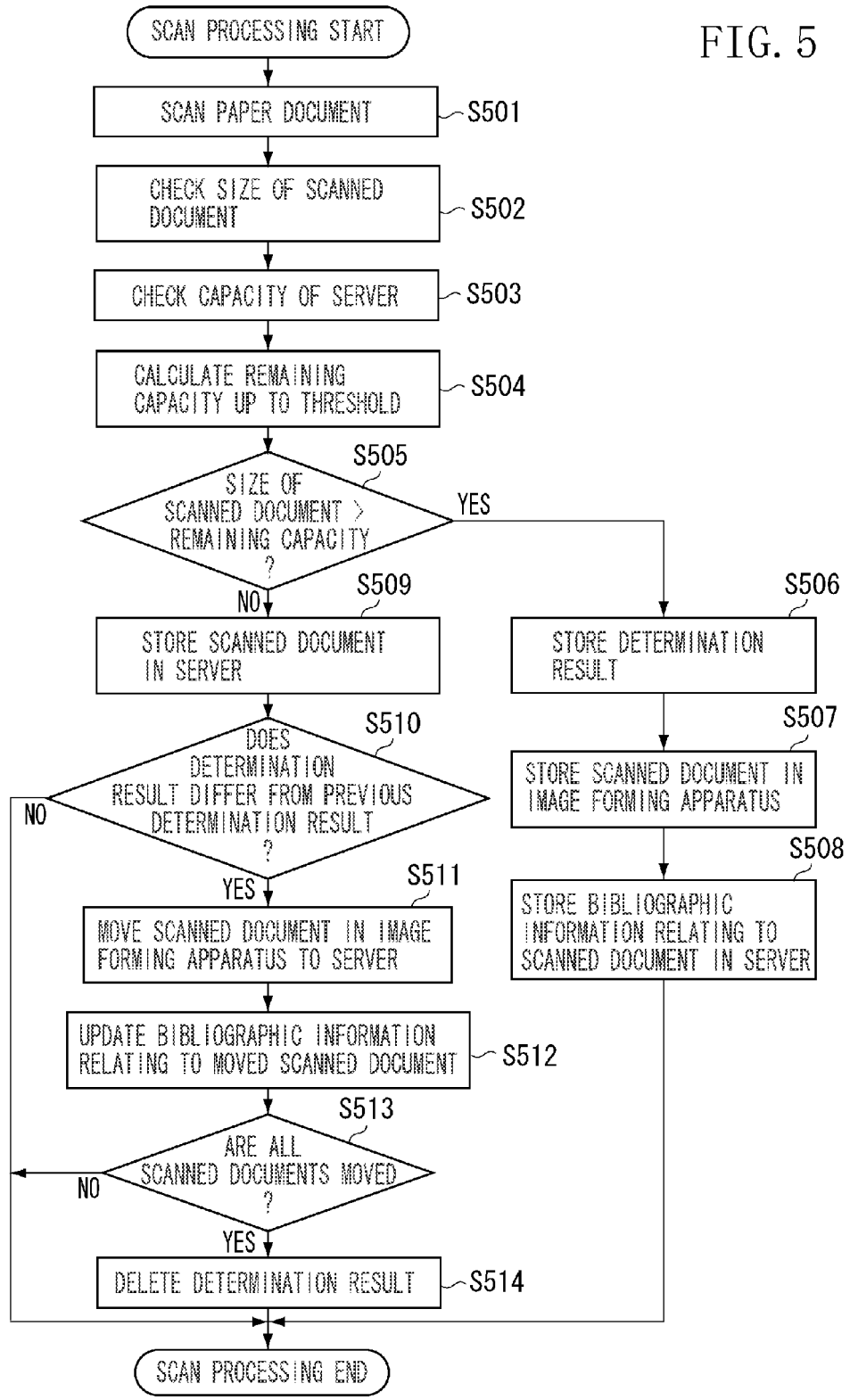
FIG. 5 is a flowchart illustrating an example of document storage processing at the time of scanning according to the first exemplary embodiment of the present invention.

An example of scanned document storage processing in the image forming apparatus 101 in the present exemplary embodiment will be described below with reference to a flowchart of FIG. 5. A program for this processing is stored in the external memory 204, is readout into the RAM 201, and is executed by the CPU 200. This is similarly true for other exemplary embodiments, described below.

In step S501, the scan control unit 301 first reads, when it is instructed to make a scan by a user operation, an image by scanning a paper document. The image generation unit 302 then generates a scanned document from digital image information received from the scan control unit 301. In step S502, the image generation unit 302 checks the size of the scanned document generated in step S501.

In step S503, the server access unit 303 then accesses the document management server 102, to check an amount of use and a free capacity of a storage area. In step S504, the threshold determination unit 304 calculates a remaining capacity up to a charging threshold based on the amount of use checked in step S503. In step S505, the threshold determination unit 304 compares the remaining capacity checked in step S504 with the size of the scanned document checked in step S502, to determine which of the remaining capacity and the size of the scanned document is greater.

If it is determined that the scanned document size is greater than the remaining capacity, i.e., if the amount of use exceeds the charging threshold (YES in step S505), the processing proceeds to step S506. In step S506, the threshold determination unit 304 records a determination result in the external memory 204. In step S507, the document storage unit 305 stores the scanned document in the external memory 204. In step S508, the document storage unit 305 further stores the bibliographic information 401 relating to the scanned document in the document management server 102, and the scan processing ends.

On the other hand, if it is determined that the remaining capacity is the scanned document size or less, i.e., if the amount of use is the charging threshold or less (NO in step S505), the processing proceeds to step S509. In step S509, the document storage unit 305 stores the scanned document in the storage area in the document management server 102. At this time, the document storage unit 305 also stores the bibliographic information 401 relating to the scanned document in the storage area in the document management server 102.

In step S510, the threshold determination unit 304 then determines whether the previous determination result stored in step S506 exists. If the previous determination result exists, the threshold determination unit 304 determines whether the determination result differs from the current determination result. As a result, if the previous determination result does not exist, and if the previous determination result exists but is equal to the current determination result (NO in step S510), the processing ends.

On the other hand, if the previous determination result and the current determination result differ from each other (YES in step S510), the processing proceeds to step S511. In step S511, the document storage unit 305 moves the scanned document stored in the external memory 204 to the storage area in the document management server 102. The movement processing is performed in a range where the total size of the scanned document to be moved does not exceed the remaining capacity calculated in step S504.

In step S512, the document storage unit 305 updates the bibliographic information 401 relating to the moved scanned document. More specifically, the document storage unit 305 rewrites the bibliographic information 401 relating to the scanned document, i.e., the storage location information 407 so that a place to which the scanned document is moved can be specified.

In step S513, the threshold determination unit 304 then determines whether all target scanned documents, which are stored in the image forming apparatus 101, are moved. If it is determined that all the target scanned documents have been moved (YES in step S513), the processing proceeds to step S514. In step S514, the threshold determination unit 304 deletes the determination result recorded in step S506.

If all the target scanned documents have not been moved (NO in step S513), the processing ends without performing the process in step S514. While the process in step S503 and the process in step S504 are considered as separate ones, both the processes may be considered as one to obtain the remaining capacity at one time.

According to the first exemplary embodiment, when the size of the scanned document is greater than the remaining capacity, the scanned document is stored in not the storage area in the document management server 102 but the external memory 204 in the image forming apparatus 101 and is managed by the bibliographic information 401. Thus, a large fee can be prevented from being charged because the amount of use of the storage area in the document management server 102 is too large, to exceed the charging threshold.

The image forming apparatus 101 is accessed by the client PC 103 that has received the bibliographic information 401 from the document management server 102, and returns the found scanned document. More specifically, the client PC 103 can access the scanned document regardless of the storage location of the scanned document.

A second exemplary embodiment of the present invention will be described below with reference to FIGS. 6 to 8.

In the first exemplary embodiment, when the scanned document is stored in the image forming apparatus 101, the image forming apparatus 101 cannot enter a sleep mode if the client PC 103 collectively accesses the image forming apparatus 101. In the second exemplary embodiment, scanned document replacement processing according to an access frequency or the like will be described.

A system configuration and a hardware configuration are similar to those in the first exemplary embodiment. Therefore, the same symbols as those used for the components in the first exemplary embodiment are used and hence, the description thereof is not repeated.

Figure 6:
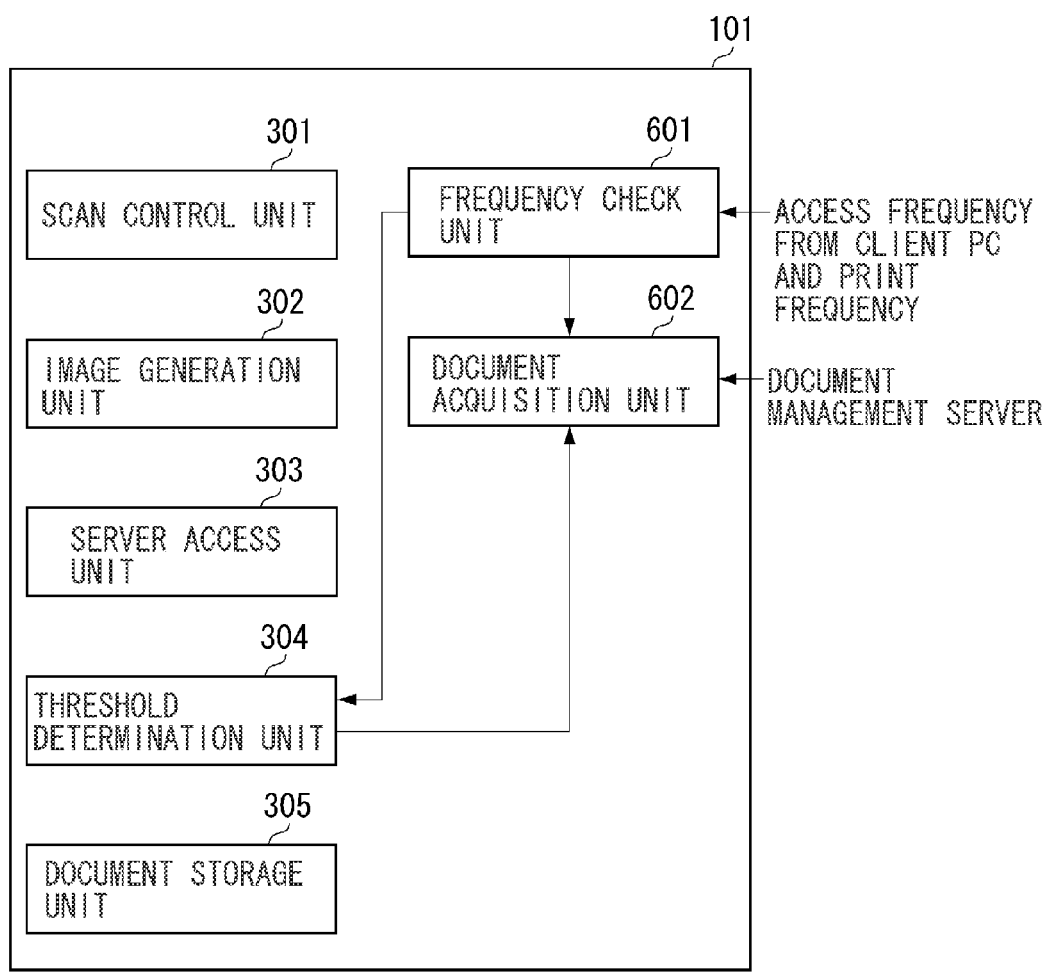
FIG. 6 is a block diagram functionally illustrating an example of a configuration for software processing according to a second exemplary embodiment of the present invention.

FIG. 6 illustrates an example of a configuration for software processing of an image forming apparatus. FIG. 6 differs from FIG. 3 according to the first exemplary embodiment in that a frequency check unit 601 and a document acquisition unit 602 are provided. The frequency check unit 601 checks an access frequency to a scanned document from a client PC 103 and a print frequency of the scanned document. A target scanned document is document data stored in a storage area in a document management server 102 and an external memory 204 in an image forming apparatus 101.

The document acquisition unit 602 acquires the scanned document from the document management server 102, stores the acquired scanned document in the external memory 204, and deletes the scanned document from the document management server 102. More specifically, the document acquisition unit 602 moves the scanned document from the storage area in the document management server 102 to the external memory 204 in the image forming apparatus 101.

A threshold determination unit 304 in the second exemplary embodiment compares the access frequency, and the print frequency of the scanned document, or a frequency obtained by synthesizing the frequencies, described below, with a threshold. The threshold determination unit 304 calculates the size of a scanned document having a frequency exceeding the threshold (if a plurality of scanned documents has frequencies exceeding the threshold, the total size of the scanned documents).

FIG. 7 illustrates information relating to an access frequency and a print frequency in a table format as an example of a use frequency of document data, illustrating the frequencies corresponding to document identification information. Frequency information 701 is stored in the external memory 204 in the image forming apparatus 101 and the document management server 102.

In this example, the frequency information 701 includes scanned document ID information 702, access frequency information 703, and print frequency information 704. The access frequency information 703 is counted up 9n such a manner that its value increases every time the client PC 103 accesses the corresponding scanned document. The print frequency information 704 is counted up in such a manner that its value increases every time the corresponding scanned document is printed.

A recording frequency of the information is desirable to be performed for a predetermined period of time as an object. The period of time may be a value that has already been registered in advance on a system, or may be a value set by a system administrator. Items illustrated in FIG. 7 are illustrative only and not a limitation.

Figure 8:
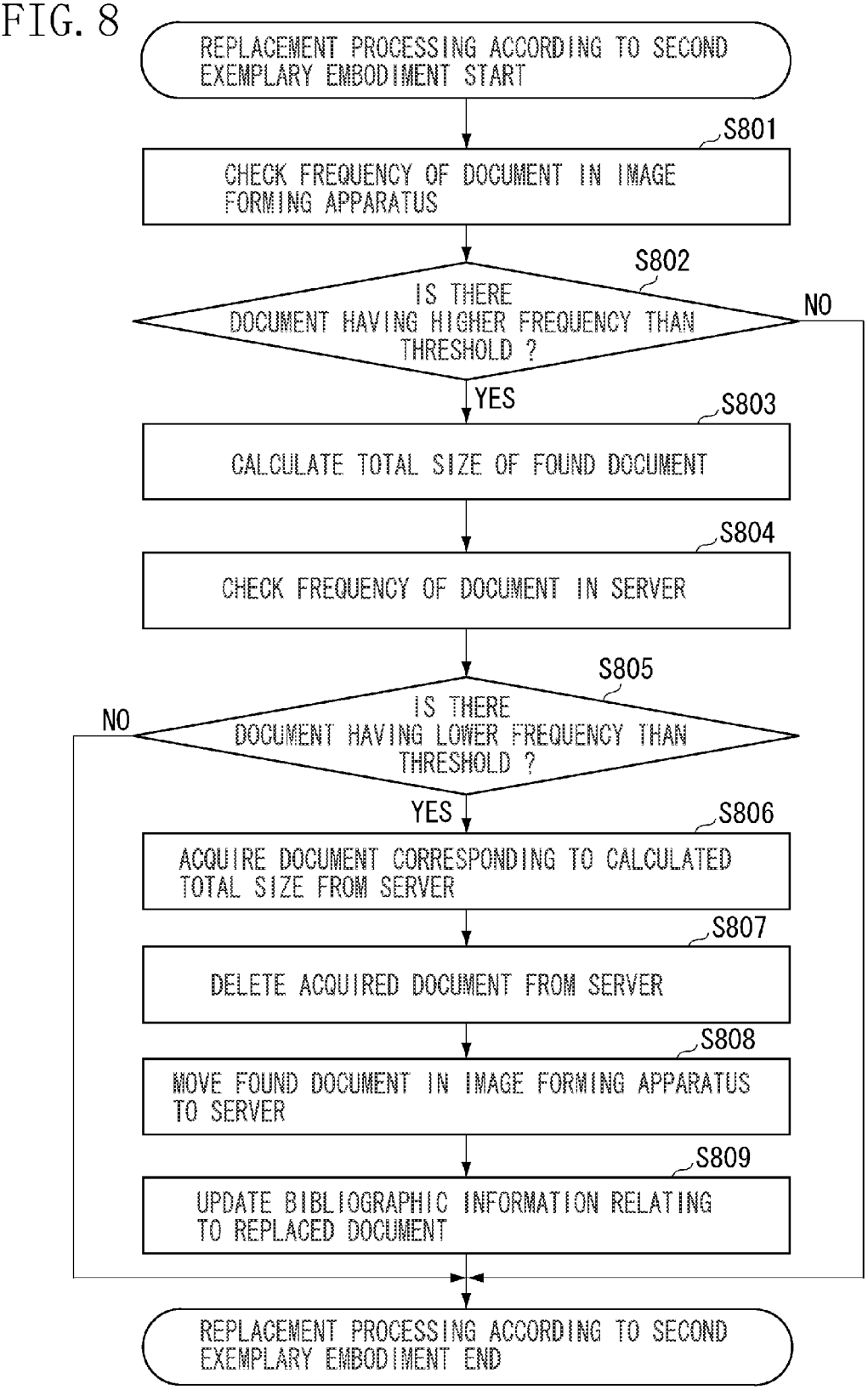
FIG. 8 is a flowchart illustrating an example of scanned document replacement processing according to the second exemplary embodiment of the present invention.

FIG. 8 is a flowchart illustrating an example of scanned document replacement processing based on an access frequency and a print frequency.

In step S801, the frequency check unit 601 accesses the frequency information 701 stored in the external memory 204, to check an access frequency to a scanned document and a print frequency of the scanned document, and check whether a use frequency is high or low.

If an integrated use frequency is calculated based on both the frequencies, the two frequencies can be calculated to give contributions basically opposite to each other. This is based on the following ideas:

1. A document having a high access frequency may be desirably stored in the document management server 102.
2. A document having a high print frequency may be desirably stored in the image forming apparatus 101 from a viewpoint of performance, e.g., to shorten a printing processing time.

For example, the frequency check unit 601 calculates the integrated frequency using the following calculation equation:

Frequency=access frequency−(print frequency×$N$)  Equation 1

In the equation 1, N represents a natural number, which can be set to any value.

In step S802, the threshold determination unit 304 then compares the frequency checked in step S801 with a threshold. The threshold may be a value that has already been registered in advance on a system or may be a value set by a system administrator.

If no scanned document is determined to have a higher frequency than the threshold (NO in step S802), the processing ends. On the other hand, if at least one scanned document is determined to have a higher frequency than the threshold (YES in step S802), the processing proceeds to step S803. In step S803, the threshold determination unit 304 calculates the total size of the at least one scanned document.

In step S804, the frequency check unit 601 then accesses the frequency information 701 in the document management server 102, to check an access frequency to a scanned document and a print frequency of the scanned document, and check whether a use frequency is high or low. There are various methods for calculating a frequency. However, the methods may desirably be matched with at least a method for calculating the frequency of a scanned document in the image forming apparatus 101.

In step S805, the threshold determination unit 304 compares the frequency checked in step S804 with a threshold. The threshold is a value that has already been registered in advance on a system or a value set by a system administrator. The threshold may differ from the threshold used for the determination in step S802.

If no scanned document is determined to have a lower frequency than the threshold (NO in step S805), the processing ends. On the other hand, if at least one scanned document is determined to have a lower frequency than the threshold (YES in step S805), the processing proceeds to step S806. In step S806, the document acquisition unit 602 acquires, out of the at least one scanned document having a lower frequency than the threshold, a number of scanned documents corresponding to the total size calculated in step S803 from the document management server 102.

The number of the acquired scanned documents may be one or plural. In step S807, the document acquisition unit 602 deletes the scanned document acquired in step S806 from the storage area in the document management server 102.

In step S808, the document storage unit 305 moves the scanned document that is determined to have a higher frequency than the threshold in step S802 from the image forming apparatus 101 to the document management server 102. In step S809, the document storage unit 305 finally updates the bibliographic information 401 relating to the scanned document deleted in step S807 and the scanned document moved in step S808. More specifically, the storage location information 407 in the bibliographic information 401 is changed with replacement processing of a storage destination of the scanned document, and the above-mentioned series of processes then ends.

If the scanned document determined to have a lower frequency than the threshold in step S805 is smaller in number than the scanned document corresponding to the total size calculated in step S803, the document acquisition unit 602 only acquires the scanned document that is determined to have a lower frequency than the threshold in step S805, and deletes the acquired scanned document from the document management server 102. In step S808, the document storage unit 305 moves the scanned documents to the document management server 102 up to a capacity corresponding to the scanned document deleted by the document acquisition unit 602.

If the document acquisition unit 602 cannot acquire the scanned document from the document management server 102 because the capacity of the external memory 204 is exhausted and no sufficient capacity remains, the above-mentioned document replacement processing is not performed. Processing for checking the capacity of the external memory 204 may be performed at the beginning of the flowchart of FIG. 8.

The replacement processing may be performed at periodical intervals or during scan processing. However, the replacement processing may be preferably performed when a sleep state in a sleep mode is released for the image forming apparatus 101 to perform any other processing.

Although only the scanned document replacement processing has been described, the document management server 102 and the image forming apparatus 101 may doubly store the scanned document if both the access frequency to the scanned document and the print frequency of the scanned document are high, for example.

In the case, the scanned document in the document management server 102 is returned if the client PC 103 accesses thereto, e.g., browses the scanned document, and the scanned document in the image forming apparatus 101 is used if the function of the image forming apparatus 101, such as printing or facsimile communication, is used. This can improve the performance of printing or the like while the frequency of release of the sleep mode is minimized.

As described above, according to the second exemplary embodiment, even when the client PC 103 collectively accesses the scanned document in the image forming apparatus 101, the frequency of release of the sleep mode in the image forming apparatus 101 can also be reduced. When the print frequency of the scanned document is high, the performance of the print processing can be improved by storing the scanned document in the image forming apparatus 101 and ensuring the stored scanned document.

A third exemplary embodiment of the present invention will be described below with reference to FIGS. 9 to 12. In the first exemplary embodiment and the second exemplary embodiment, when the image forming apparatus 101 stores the scanned document, the client PC 103 may not access the scanned document depending on a client PC. More specifically, the client PC 103 can access the document management server 102 on the Internet but cannot access the image forming apparatus 101 because they differ in networks, for example.

In the third exemplary embodiment, an access check unit 1001 for checking whether there is a scanned document that cannot be accessed by a client PC 902 is provided, to move the scanned document to a document management server 102 according to a check result. A hardware configuration is similar to that in the first exemplary embodiment and hence, the description thereof is not repeated.

The third exemplary embodiment differs from the first exemplary embodiment in that an image forming apparatus 901, a client PC 902, and a network transmission path 903 are added in FIG. 1. The network transmission paths 104 and 903 cannot access each other because their network addresses differ from each other, for example, but can access the internet network 105.

The image forming apparatus 901 and the client PC 902 are connected to the network transmission path 903, and respectively have similar functions to those of the image forming apparatus 101 and the client PC 103. The configuration is not limited thereto. For example, the number of network transmission paths may be three or more.

Figure 9:
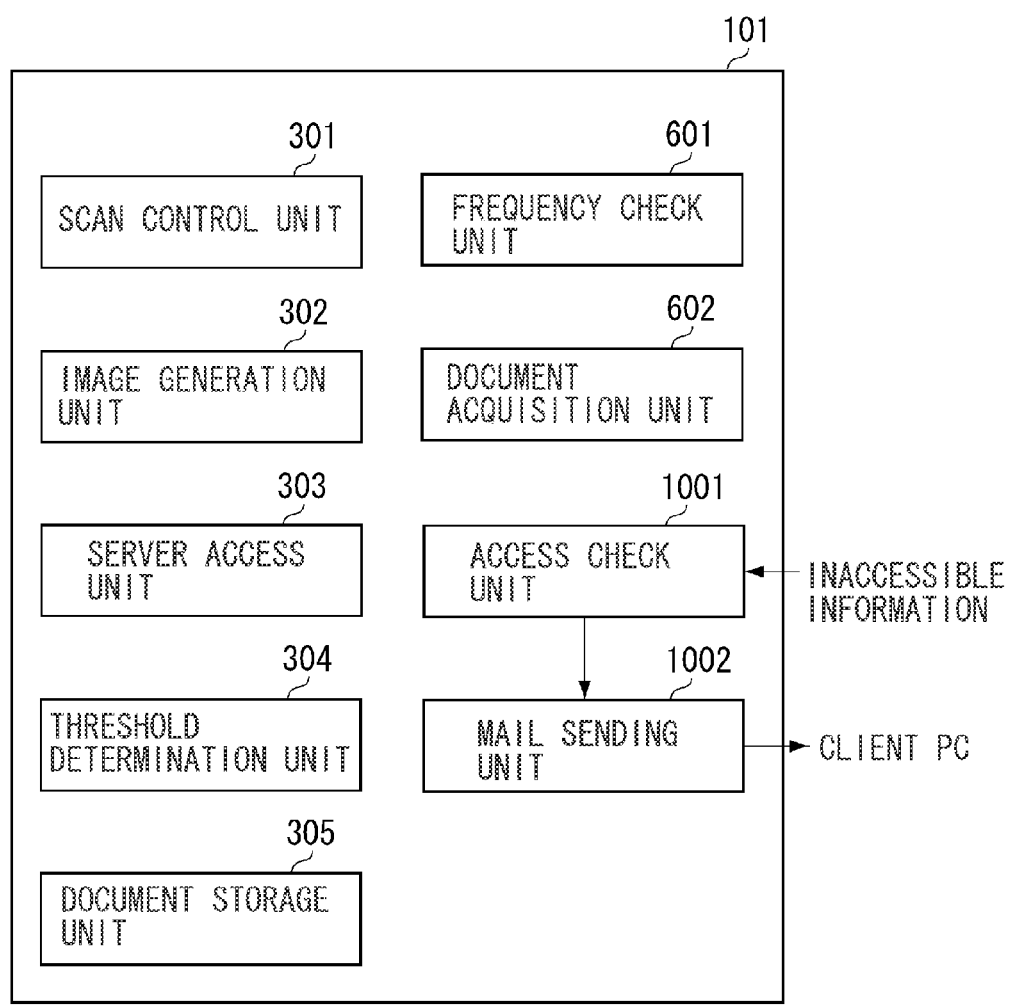
FIG. 9 is a functional block diagram illustrating an example of a configuration for software processing according to a third exemplary embodiment of the present invention.

FIG. 9 illustrates an example of a configuration for software processing in an image forming apparatus to which the present invention can be applied. FIG. 9 differs from FIG. 6 illustrated in the second exemplary embodiment in that an access check unit 1001 and a mail sending unit 1002 are provided.

The access check unit 1001 accesses the document management server 102. A record indicating that the client PC 902 has failed in accessing actual data of a scanned document (document data itself) stored in an image forming apparatus 101 remains in the document management server 102. The access check unit 1001 checks the presence or absence of a client PC 902 that cannot access the data from the exterior.

More specifically, the access check unit 1001 accesses and checks information recording that the client PC 902 has failed in accessing the scanned document and a situation at that time (hereinafter referred to as inaccessible information). Thus, the presence or absence of a client PC 902 that cannot access the scanned document held by the image forming apparatus 101 itself can be checked.

FIG. 10 illustrates an example of the inaccessible information 1101, illustrating identification information relating to a scanned document and a user who has accessed the scanned document, and date information in a table format. The inaccessible information 1101 is stored in the document management server 102. In this example, when the client PC 902 accesses bibliographic information relating to a scanned document but fails in accessing actual data of the scanned document, data representing a result of an access status is added.

ID information 1102 relating to a scanned document and ID information 1103 relating to a user who has accessed the scanned document (access user) are represented by numbers, and date information 1104 relating to a date on which an attempt to access the scanned document has been made is represented in a "year/month/day" format. More specifically, when the access user accesses bibliographic information in a particular scanned document, as described above, it is recorded that actual data stored in the image forming apparatus 101 cannot be accessed.

Referring to FIG. 9 again, the mail sending unit 1002 sends mail to the client PC 902. In this example, a user specified by the access user ID information 1103 recorded in the inaccessible information 1101 is notified by mail, when actual data of a scanned document that could not be accessed before has been moved to the document management server 102, of the fact.

FIG. 11 is a flowchart illustrating an example of scanned document replacement processing based on inaccessible information 1101. Description of similar processes to those illustrated in FIG. 8 is not repeated. Hereinbelow, different parts thereof will be described mainly.

In step S1201, the access check unit 1001 first accesses the inaccessible information 1101 in the document management server 102, and checks the presence or absence of a document that cannot be accessed. In step S1202, the access check unit 1001 determines, out scanned documents that cannot be accessed, whether the scanned document having actual data is stored in the image forming apparatus 101.

If the scanned document is determined not to exist (NO in step S1202), the processing ends. On the other hand, if the scanned document is determined to exist (YES in step S1202), the processing proceeds to step S1203. In step S1203, a threshold determination unit 304 calculates the total size of the scanned document. Processes in steps S1203 to S1207 are similar to the processes in steps S803 to S807 illustrated in FIG. 8 and hence, the description thereof is not repeated.

In step S1208, a document storage unit 305 moves the scanned document, which has been determined not to be accessed in step S1201, to a storage area in the document management server 102. In step S1209, the document storage unit 305 updates storage location information 407 for bibliographic information 401 relating to the scanned document deleted in step S1207 and the scanned document moved to the document management server 102 in step S1208.

In S1210, the access check unit 1001 acquires from the inaccessible information 1101 the access user ID information 1103 corresponding to the scanned document moved in step S1208. More specifically, a user who has failed in accessing the scanned document before is specified. At this time, the access check unit 1001 may acquire information relating to its mail address.

In step S1211, the mail sending unit 1002 notifies by electronic mail (e-mail) a client PC 902, which is used by the user, that the scanned document has been moved to the document management server 102 based on the access user ID information 1103 acquired in step S1209, and a series of processes ends.

While the above-mentioned scanned document replacement processing may be performed at periodical intervals or during scan processing, it may be desirably executed when a sleep state is released for the image forming apparatus 101 to perform any other processing. When the scanned document replacement processing is to be performed as early as possible from the time point where the scanned document cannot be accessed, the processing is to be performed as quickly as possible at short intervals.

As described above, according to the third exemplary embodiment, even if the client PC 902 cannot access the actual data of the scanned document in the image forming apparatus 101, the replacement processing can result in access to the data in the document management server 102. According to the present invention, a large fee can be prevented from being charged by a too large amount of use of the storage area in the document management apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-194038 filed Aug. 25, 2009, which is hereby incorporated by reference herein in its entirety.

What is claimed is:

1. An image forming apparatus comprising:
   a first acquisition unit configured to acquire information representing an amount of use of a storage area of a document management apparatus different from the image forming apparatus;
   a determination unit configured to determine whether the amount of use of the storage area of the document management apparatus exceeds a threshold;
   a document storage unit configured to store data in a storage unit of the image forming apparatus when the amount of use exceeds the threshold, and store the data in the storage area of the document management apparatus when the amount of use is less than or equal to the threshold; and
   a frequency check unit configured to check a use frequency of data stored in the storage unit and the storage area, the document storage unit configured to move the data when it is determined to be lower than a threshold for the use frequency, from the storage area to the storage unit, and move the data when it is determined to be higher than the threshold for the use frequency, from the storage unit to the storage area to replace the data between the storage area and the storage unit at a time point where a sleep state is released.

2. The image forming apparatus according to claim 1, wherein the document storage unit stores management information relating to a storage location of the data in the storage area when the amount of use exceeds the threshold.

3. The image forming apparatus according to claim 1, wherein the document storage unit stores, when the amount of use exceeds the threshold, a determination result, compares, when the image is read, the stored determination result with a new determination result, and moves, when both the results differ from each other, the data stored in the storage unit to the storage area.

4. The image forming apparatus according to claim 1, further comprising:
   an access check unit configured to check a presence or an absence of a client machine that cannot access the stored data in the storage unit from the exterior; and
   a sending unit configured to send electronic mail to the client machine,
   wherein the determination unit calculates the total size of the data that the access check unit determines not to be accessed by the client machine,
   wherein the document storage unit moves the use frequency of the data when it is determined to be lower than the threshold, the data corresponding to the total size from the storage area to the storage unit, and moves the data that cannot be accessed by the client machine from the storage unit to the storage area, and
   wherein the sending unit notifies the client machine that cannot access the data by mail that the data has been moved to the storage area.

5. The image forming apparatus according to claim 4, wherein information recording that the client machine cannot access the data stored in the storage unit is stored in the document management apparatus, and the access check unit specifies the client machine that cannot access the data by referring to the information.

6. A method for controlling an image forming apparatus, the method comprising:
   acquiring information representing an amount of use of a storage area from a document management apparatus different from the image forming apparatus;
   determining whether the amount of use of the storage area of the document management apparatus exceeds a threshold;
   storing data in a storage unit in the image forming apparatus when the amount of use exceeds the threshold;
   storing the data in the storage area of the document management apparatus when the amount of use is less than or equal to the threshold;
   checking a use frequency of data stored in the storage unit and in the storage area;
   moving the data when it is determined to be lower than a threshold for the use frequency, from the storage area to the storage unit; and
   moving the data when it is determined to be higher than the threshold for the use frequency, from the storage unit to the storage area to replace the data between the storage area and the storage unit at a time point where a sleep state is released.

7. The method according to claim 6, further comprising storing management information relating to a storage location of the data in the storage area when the amount of use exceeds the threshold.

8. The method according to claim 6, further comprising:
   storing, when the amount of use exceeds the threshold, the determination result;
   comparing, when an image is read, the stored determination result with a new determination result; and
   moving, when both the results differ from each other, the data stored in the storage unit to the storage area.

9. The method according to claim 6, further comprising:
   checking a use frequency of data stored in the storage unit and the storage area;
   moving the use frequency of the data when it is determined to be lower than a threshold for the use frequency, from the storage area to the storage unit; and
   moving the use frequency of the data when it is determined to be higher than the threshold for the use frequency, from the storage unit to the storage area, in a case where a sleep state of the image forming apparatus is released.

10. A non-transitory computer-readable storage medium storing a computer executable program to implement a method comprising:
    acquiring information representing an amount of use of a storage area from a document management apparatus different from the image forming apparatus;
    determining whether the amount of use of the storage area of the document management apparatus exceeds a threshold;
    storing data in a storage unit in an image forming apparatus when the amount of use exceeds the threshold;
    storing the data in the storage area of the document management apparatus when the amount of use is less than or equal to the threshold;
    checking a use frequency of data stored in the storage unit and in the storage area;
    moving the use frequency of the data when it is determined to be lower than a threshold for the use frequency, from the storage area to the storage unit; and
    moving the use frequency of the data when it is determined to be higher than the threshold for the use frequency, from the storage unit to the storage area to acquire the data from the document management apparatus to replace the data between the storage area and the storage unit at a time point where a sleep state is released.

11. The non-transitory computer-readable storage medium according to claim 10, wherein the method further comprises, storing management information relating to a storage location of the data in the storage area when the amount of use exceeds the threshold.

12. The non-transitory computer-readable storage medium according to claim 10, wherein the method further comprises:
    storing, when the amount of use exceeds the threshold, a determination result;
    comparing, when the image is read, the stored determination result with a new determination result; and
    moving, when both the results differ from each other, the data stored in the storage unit to the storage area.

13. The non-transitory computer-readable storage medium according to claim 10, wherein the method further comprises:
    checking a use frequency of data stored in the storage unit and the storage area;
    moving the use frequency of the data when it is determined to be lower than a threshold for the use frequency, from the storage area to the storage unit; and
    moving the use frequency of the data when it is determined to be higher than the threshold for the use frequency, from the storage unit to the storage area, in a case where a sleep state of the image forming apparatus is released.

* * * * *